United States Patent

[11] 3,601,504

| [72] | Inventor | James R. McBurnett<br>Stillwater, Okla. |
| [21] | Appl. No. | 859,806 |
| [22] | Filed | Sept. 22, 1969 |
| [45] | Patented | Aug. 24, 1971 |
| [73] | Assignee | Allis-Chalmers Manufacturing Company<br>Milwaukee, Wis. |

[54] COMPENSATOR AND PRESSURE LIMITING DEVICE
6 Claims, 3 Drawing Figs.

| [52] | U.S. Cl. | 417/213, 417/300, 60/52 VS |
| [51] | Int. Cl. | F04b 49/00 |
| [50] | Field of Search | 91/504–506; 417/213, 212, 300, 218; 60/52 VS |

[56] References Cited
UNITED STATES PATENTS

| 2,892,311 | 6/1959 | Van Gerpen | 60/52 |
| 2,892,312 | 6/1959 | Allen et al. | 60/52 |
| 3,009,422 | 11/1961 | Davis et al. | 417/222 |
| 3,067,693 | 12/1962 | Lambeck | 417/300 |
| 3,444,689 | 5/1969 | Budzich | 60/52 |

*Primary Examiner*—William L. Freeh
*Attorneys*—Arthur L. Nelson, Kenneth C. McKivett and Robert B. Benson ABSTRACT: A pressure limiting and pressure regulating device operating as a compensator on a variable stroke pump in a load sensitive hydraulic system.

PATENTED AUG 24 1971 3,601,504
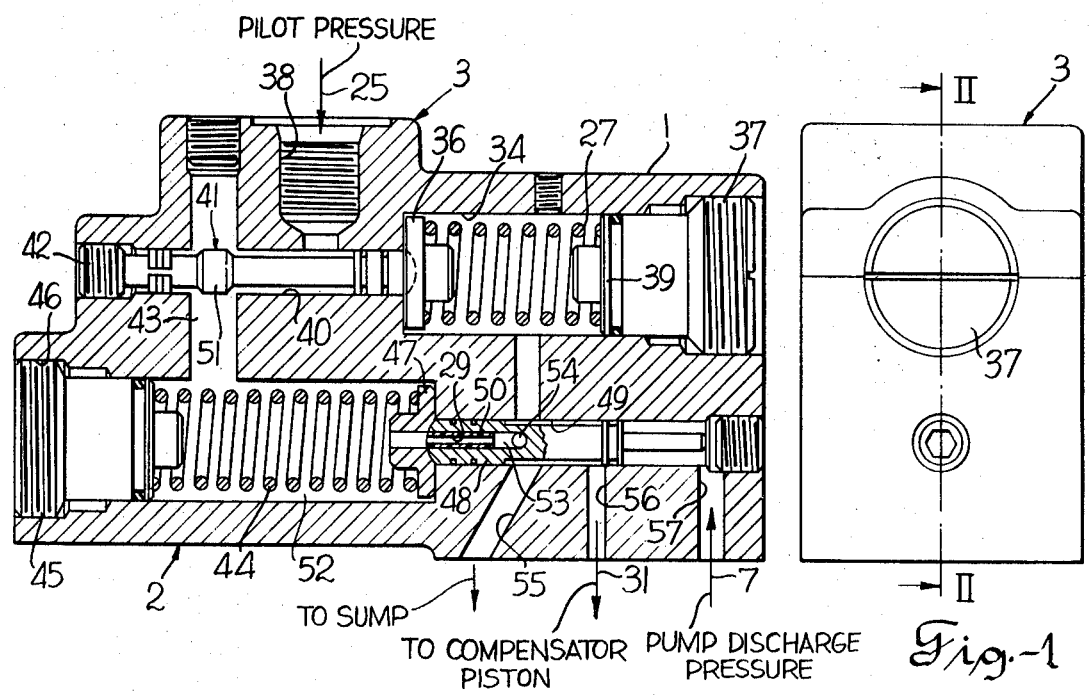
Fig.-1
Fig.2
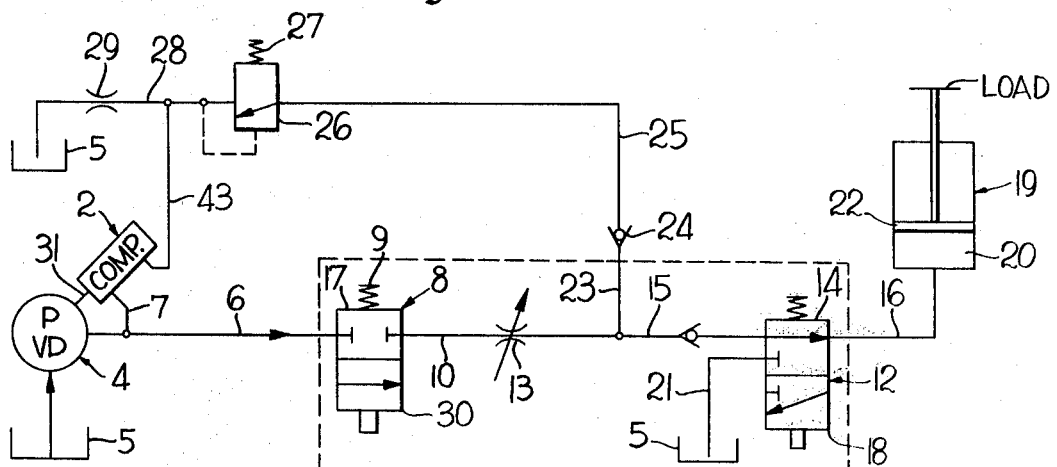
Fig.3
Inventor
James R. McBurnett

COMPENSATOR AND PRESSURE LIMITING DEVICE

This invention relates to a hydraulic system and more particularly to a compensator having peak pressure limiting means for regulating the stroke of a variable stroke pump in a load sensitive hydraulic system.

The modern tractor uses a hydraulic system including various motors to operate auxiliary equipment. A source of pressurized fluid driven by the engine generally provides the motivating force in the system for operating the motors. There are several types of hydraulic systems used. One system is known as the open center system which provides for a constant displacement of the pump while fluid is discharged to the sump either through various motors or through a relief valve depending on the number of functions required in the auxiliary equipment. This type of system provides a required pressure but has constant, excessive flow rate and consequent horsepower loss in the system.

The closed center system provides the correct flow rate which is the flow required by the various motors in the systems in operation, however, the pressure in this type of a system is a constant high value and consequently horsepower is lost.

An improved type of system is a load sensitive closed center system which combines the desirable features of both of the above systems and by providing the required flow rate and pressure for the motors operating the auxiliary equipment. The horsepower loss is negligible since only the required amount of fluid is pumped at the required pressure of the system by a compensating means.

Accordingly, this invention provides such a compensating means which regulates the pressure in the system to a predetermined value above the pressure required for the load. The pressure is controlled by stroking and destroking the hydraulic pump in response to pressures demanded by the load. Also incorporated in the system is a peak pressure limiting device which limits the peak pressure in the system so that the discharge pressure can never reach a destructive level if the load is immovable, for instance when the hydraulic motor is stalled.

Accordingly it is an object of this invention to provide a peak pressure limiting device in a hydraulic system.

It is another object of this invention to provide a pressure compensating device to regulate the operating pressure in the hydraulic system.

It is a further object of this invention to provide a pressure-regulating means in the hydraulic system which controls the stroke of the hydraulic pump and also limits the peak pressure in the system to prevent excessive pressure in the system.

It is a further object of this invention to regulate the pump pressure to a predetermined value in excess of the load pressure in the hydraulic system and also to provide a means for limiting the peak pump pressure in the event that the load pressure becomes excessive.

The object of this invention is accomplished by providing a compensating spool subjected to pump pressure on one side and pilot pressure on the opposite side. The surface of the spool subjected to the pilot pressure is also subjected to a mechanical force such as a compensator spring in a pilot pressure which is equivalent to a hydraulic pressure of approximately 250 pounds per square inch. The compensating spool operates to place a compensator piston in communication between the sump or the pump and provides stroking and destroking of the pump respectively. The peak load pressure is controlled by the pressure limiting spool which is normally biased to a position admitting pilot pressure to the pilot pressure chamber receiving the compensator spring and operating on the opposing side at the compensator spool from the pump pressure. The pilot pressure is equal to the load pressure and accordingly the compensator spool is biased to a position venting the compensator piston to sump. When a peak pump pressure is generated, the pilot pressure transmitted to the pilot spool biases the spool to a position preventing communication between the pilot line and the pilot pressure chamber. This in turn reduces the pressure in the pilot pressure chamber causing the compensating spool to shift and place and compensator piston in communication with the pump to destroke the pump and limit the peak pump pressure and pressure in the hydraulic system.

The preferred embodiment of this invention is shown in the attached drawings.

FIG. 1 illustrates an end of the load pressure limiting device.
FIG. 2 is a cross section view taken on line II—II of FIG. 1.
FIG. 3 is the schematic diagram of a hydraulic system including the pressure limiting device.

Referring to FIG. 1 the end view of the compensator and pressure limiting device is shown. The pressure limiting device is cut at a section shown in FIG. 1 and illustrated in FIG. 2. The compensator and pressure limiting device includes a housing 1 enclosing the load sensitive compensator 2 and the pressure limiting device 3. The compensator 2 is generally illustrated schematically in FIG. 3.

The compensator 2 is connected to a variable displacement pump 4 as shown in FIG. 3. The variable displacement pump 4 receives fluid from the sump 5 and pressurizes fluid in the conduit 6 which is connected through the conduit 7 to the compensator 2. The section 8 of control valve 11 is normally biased to a closed position by spring 9 and can be manually shifted to the open position to connect conduits 6 and 10. Section 12 of valve 11 is normally biased to the lift position and can be manually biased to the lower position. The control valve 11 includes the section 8 and section 12 as well as the variable orifice 13.

With the valve 11 transmitting pressurized fluid to the cylinder 19 the pump will stroke until the discharge pressure exceeds the pilot pressure by approximately 250 pounds per square inch. The flow rate through the valve is determined by the area of variable orifice 13. The pump pressure is then equal to the load pressure plus 250 pounds per square inch. The valve transmits fluid to the load when the portion 30 of section 8 of the valve 11 is connected between the conduit 6 and 10 and the portion 14 connects the conduits 15 and 16. When the portion 17 of section 8 is as shown in FIG. 3 and the portion 18 of section 12 is connected to conduit 16 the fluid from the hydraulic cylinder 19 will discharge from the chamber 20 through the conduit 16, portion 18 of section 12 of valve 11 and conduit 21 to sump 5. The hydraulic cylinder 19 includes a piston 22 which is extended when pressurized fluid is admitted to the pressure chamber 20 in cylinder 19. The load produces the discharge fluid from chamber 20. It is understood that the pressure limiting device might be used with a double action cylinder as well as a single action cylinder.

The conduit 15 is connected by a pilot line 23 to the check valve 24 to conduit 25. Conduit 25 is connected to the pressure-reducing valve 26 which is biased by the spring 27 to an open position as shown in FIG. 3. The pressurized fluid passes through valve 26 and flows through conduit 28 and orifice 29 to the sump 5. This portion of the schematic diagram in FIG. 3 essentially illustrates the functioning of the pressure limiting device 3 which will be subsequently described. It is also understood that conduit 28 is connected to the compensator by the conduit 43. The conduit 31 is connected to compensator piston for stroking and destroking of the variable displacement pump 4.

The pressure limiting device 3 and compensator 2 include a housing 1 defining a cylindrical opening 34. The cylindrical opening 34 receives a compression spring 27 which is compressed against the spring seat 36 and the maximum pressure adjustment screw 37. The adjustment screw 37 carries the spring retainer 39. The greater the compression force of spring 27 created by the adjustment screw 37, the greater the maximum peak pressure of the pressure limiting device 3.

A pilot pressure line 25 is connected to a fitting (not shown) threadedly received in the threaded opening 38 and is connected to the spool passage 40 which receives the pressure limiting spool 41. The pressure limiting spool 41 is seated on the plug 42 in response to the biasing force of the peak pressure limiting spring 27 engaging the spring retainer 36. The pressure limiting spool 41 is normally held in a position as shown permitting communication between the threaded opening 38 and the cross passage 43. The pressure limiting device is also connected to the load sensitive compensator which includes a compensator spring 44 engaging the lead pressure adjusting screw 45 threadedly received in the threaded opening 46. The compressive force of the spring determines the lead pressure or the pressure differential between the load and the pump discharge during normal operating conditions. The compensator spring 44 is seated on a spring seat 47 which engages the end of the compensator spool 48 which is reciprocally received within the cylindrical opening 49. The spool 48 also carries a sleeve 50 having an orifice 29 limiting the flow of pressurized fluid from the pilot pressure chamber 52 through the compensating spool axial passage 53. The port 54 is connected to the cylindrical opening 49. The cylindrical opening 49 is connected to a sump passage 55 leading to the sump and a compensating piston passage 56 connected to the compensator piston of the variable displacement pump 4. THe pump passage 57 is connected to the discharge side of the variable displacement pump 4 through conduit 7. The pressure limiting device and load sensitive compensator as illustrated in FIG. 2 shows the positioning of the spools when the variable displacement pump is stroking and the valve at the pressure limiting device is open.

THe operation of this device will be described in the following paragraph. THe schematic diagram as illustrated in FIG. 3 illustrates a pressure sensitive closed center system. The system will provide pressurized fluid at the pressure required to operate the fluid motors in the system without excessive flow. The horsepower loss in this type of system is reduced to a minimum as the only flow when the motors are in operation is a limited amount of leakage through the orifice 29. The pressure limiting device limits the system pressure to a reasonable level by limiting the pump pressure. For the purpose of illustration it is considered that the pump will destroke until discharge pressure of the pump exceeds the pilot pressure by approximately 250 pounds per square inch. The differential pressure, however, is adjustable by adjusting the compression of the compensator spring 44 by the compensator adjustment screw 45. The flow rate at this point is determined by the area of the variable area orifice 13 in the valve 11. The pump pressure is assumed to be equal to the load pressure plus 250 pounds per square inch. Without a pressure limiting device 3 a discharge pressure can reach a destructive level if the load becomes immovable. Accordingly, the pressure limiting device overcomes this hazard.

The pressure limiting device includes a pressure-reducing valve 26 having the pressure limiting spool 41 operating in passage 40 to close communication between passage 40 and 43 in response to excessive pressures. The hydraulic fluid is flowing to the load at high pressure and the pilot pressure closes valve 26 between passage 40 and 43. The hydraulic fluid at pilot circuit pressure in chamber 52 is bled through the orifice 29 reducing the pressure in the chamber 52 and shifting the compensator spool 48 to provide communication between the compensator piston and the pump and destroke the pump to reduce the pump discharge pressure.

The combination of the preload on the pressure limiting spring 27 and the area of the spool 41 determines the pressure required to move the spool 41. Under normal pressures the spool lies in the left-hand position in the passage 40 and the pilot pressure is communicated directly to the chamber 52 containing the compensator spring 44. Since the pump discharge pressure acts upon the same area as the pilot pressure of the compensator spool 48 the pump pressure must be greater than the pilot pressure by an amount determined by the compensator spring 44. Therefore, under normal operating pressures the pressure limiting device 3 is inoperative and does not interfere with normal operations of the load sensitive pressure compensator 2.

When the compensator spool 48 is biased to the right-hand position by the compensator spring 44 the compensator passage 56 is in communication with the sump passage 55 and the pump will increase its stroke. The pump stroke will increase until the pump discharge pressure exceeds the pilot pressure by 250 pounds per square inch.

With an increase in pressure on the discharge side of the pump in the pump passage 57, the compensator spool will be biased in the left-hand direction against the force of the compensator spring 44. This in turn will place communication between the pump passage 57 and the compensator piston passage 56 and then cause a destroking of the pump. This action of the compensator piston is an interaction of hydraulic forces between the pump pressure which has been described above.

For the purpose of illustration, when the pressure in the compensator spring chamber 52 exceeds 2,000 pounds per square inch the force due to the preload on the pressure limiting device spring 27 is overcome and the spool 41 moves to the right in its passage 40. The pilot pressure then becomes blocked by the land 51 on the spool 41 and the pressure acting on the left-hand end of the piston 48 is restricted to a safe-operating level which would be for example, 2,000 pounds per square inch. The pump discharge pressure is therefore restricted to a safe level which is considered for the purpose of illustration, 2,250 pounds per square inch, which is the pilot pressure plus 250 pounds per square inch.

The preferred operation of this invention has been illustrated and described and will be set forth in the following claims.

The embodiments of the invention in which an exclusive property or privilege is claimed are defined as follows:

1. A compensator and peak pressure limiting device for use with a variable displacement pump in a load sensitive hydraulic system comprising, a housing defining a cylindrical opening, a pressure compensator spool mounted for reciprocal movement in said cylindrical opening in said housing, said housing defining a sump passage, a compensator passage for connection to a pressure compensator piston on said pump and a pump pressure passage for connection to the high-pressure side of said pump with said passages axially spaced and in communication with said cylindrical opening, said housing and compensator spool defining a pilot pressure chamber receiving a resilient means biasing said compensator spool to a position providing communication between said sump passage and said compensator passage for applying sump pressure to the compensator piston, orifice means connecting said pilot pressure chamber to sump, said pump pressure passage transmitting pressurized fluid from said pump to bias said compensator spool against the force of said biasing means to provide communication between said pump pressure passage and said compensator passage for applying pressurized fluid to the pressure compensator piston, said housing defining a pilot pressure passage adapted for connection to a pilot pressure line in said hydraulic system and said pilot pressure chamber, a peak pressure limiting valve in said pilot pressure passage, resilient means biasing said peak pressure limiting valve to a normally open position permitting communication between the pilot pressure line and said pilot pressure chamber, said limiting valve interrupting communication between said pilot line and said pilot pressure chamber when the peak pilot pressure reaches a predetermined value to allow pump pressure transmitted through said pump pressure passage to bias said compensator spool for transmission of pump pressure through said compensator passage and apply pump pressure to said compensator piston and thereby prevent the pump for producing excessive pressure in said hydraulic system.

2. A compensator and peak pressure limiting device as set forth in claim 1 wherein said biasing means in said pilot pressure chamber includes a differential pressure adjusting means to vary the differential pressure of the pump discharge pressure relative to the pilot pressure.

3. A compensator and peak pressure limiting device as set forth in claim 1 wherein said peak pressure limiting valve includes means to provide a maximum pressure adjustment engaging said resilient means to preset the predetermined value at which the peak pilot pressure operates the pressure limiting valve to close said pilot pressure passage.

4. A compensator and peak pressure limiting device as set forth in claim 1 wherein said compensator spool defines an orifice permitting limited flow from said pilot pressure chamber to said sump.

5. A pressure regulating device and peak pressure limiting device as set forth in claim 2 wherein said biasing means includes a spring preset to a predetermined force to control the differential pressure in said hydraulic system.

6. The compensator and peak pressure limiting devices as set forth in claim 3 wherein said resilient means in said peak pressure limiting valve includes a spring biasing said peak pressure limiting valve to an open position for admitting pilot pressure fluid in said pilot pressure chamber.

PO-1050
(5/69)

UNITED STATES PATENT OFFICE
CERTIFICATE OF CORRECTION

Patent No. 3,601,504            Dated August 24, 1971

Inventor(s) James R. McBurnett

It is certified that error appears in the above-identified patent and that said Letters Patent are hereby corrected as shown below:

Column 4, claim 1, line 67, "for" should be --- from ---.

Column 6, claim 6, line 8, "in" should be --- to ---.

Signed and sealed this 18th day of April 1972.

(SEAL)
Attest:

EDWARD M. FLETCHER, JR.          ROBERT GOTTSCHALK
Attesting Officer                 Commissioner of Patents